Patented Jan. 8, 1924.

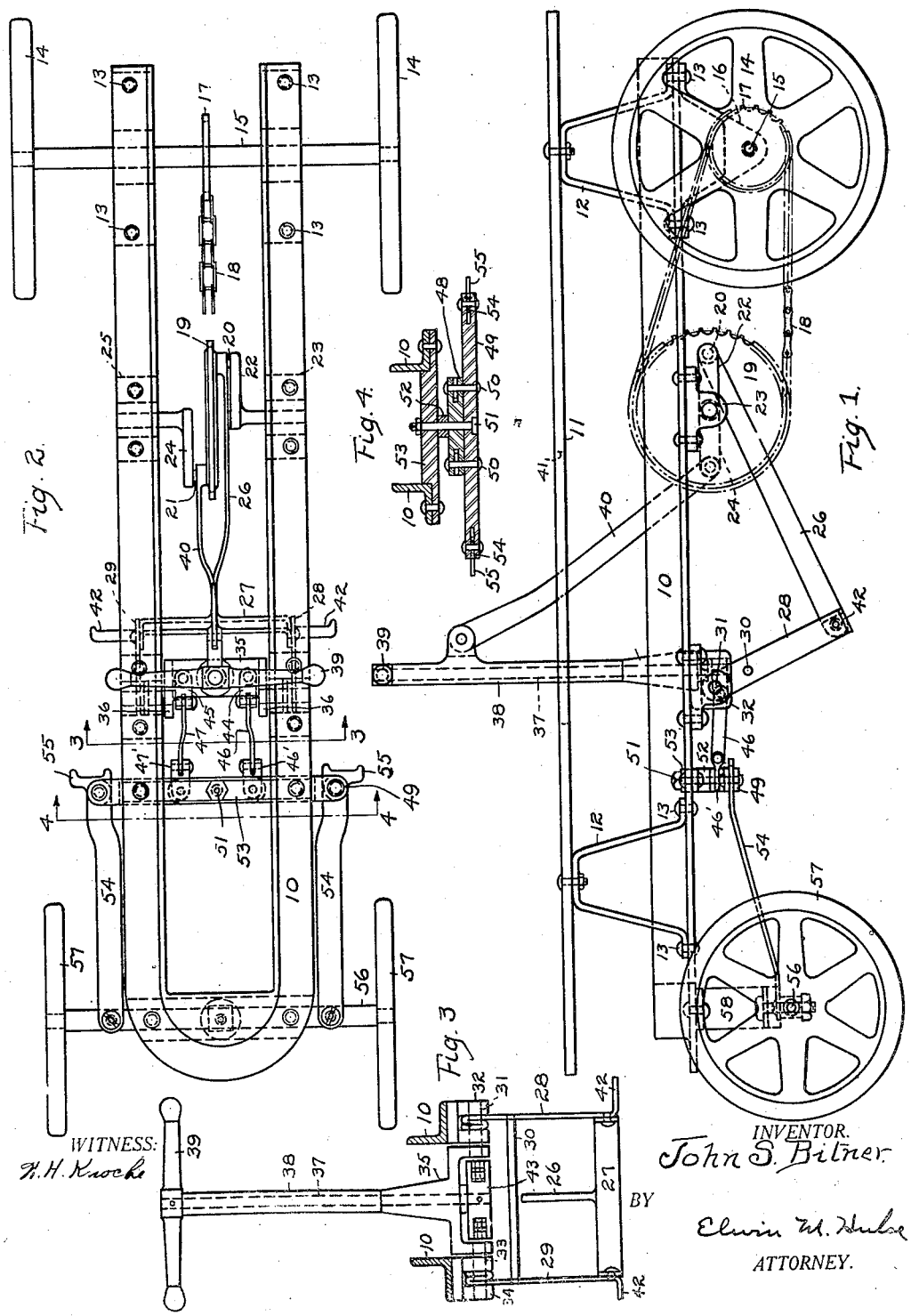

1,479,887

UNITED STATES PATENT OFFICE.

JOHN S. BITNER, OF FORT WAYNE, INDIANA.

VEHICLE.

Application filed November 28, 1921. Serial No. 518,146.

*To all whom it may concern:*

Be it known that I, JOHN S. BITNER, a citizen of the United States, residing at Fort Wayne, in the county of Allen and State of Indiana, have invented new and useful Improvements in Vehicles, of which the following is a specification.

The invention relates to vehicles and particularly to the type of vehicles which are propelled by the hands or feet of the user. The object of the invention is to provide a novel vehicle wherein the user may propel the same by both his hands and his feet and thereby gain a maximum of speed, the vehicle being serviceable for a child to use and for adults as well.

I accomplish the invention by the novel combination and arrangement of parts hereinafter described, one embodiment of the invention being illustrated in the accompanying drawings, in which drawings—

Figure 1 is a side elevational view of a vehicle constructed in accordance with the invention; Fig. 2 a plan view of the same, the seat board being removed; Fig. 3 a cross-sectional view on line 3—3 of Fig. 2 and Fig. 4 a cross-sectional view on line 4—4 of Fig. 2.

Referring to the drawings 10 indicates the frame of the vehicle formed, preferably, of angle iron. A board 11 is secured to the brackets 12 suitably secured to the frame, as by the rivets 13. The rear wheels 14 are secured to the axle 15 revolubly mounted in the brackets 16 depending from and secured to the frame. A sprocket wheel 17 is secured to the axle 15 and a sprocket chain 18 engages the wheel 17 and also engages a sprocket wheel 19. The sprocket wheel 19 has crank pins 20 and 21 projecting laterally from its opposite sides, the pins being positioned at diametrically opposite points on the wheel. A crank 22 is connected to pin 20 and is supported in bearing 23 depending from the frame 10, and a crank 24 is connected to the pin 21 and is supported in a bearing 25 depending from the frame 10.

A link 26 is pivotally connected at its rear end to the crank pin 20 and its forward end is secured to a plate 27 pivoted at its opposite ends to the lower ends of two arms 28 and 29 having a rod 30 connecting them adjacent their upper ends. The upper end of arm 28 is pivoted on a pin or shaft 31 mounted in a bearing 32 depending from the frame 10, and similarly, the upper end of the arm 29 is pivoted on a pin or shaft 33 mounted in a bearing 34 depending from the frame. A yoke 35 is pivotally mounted on the inner ends of the pins 31 and 33, the pivotal points being in forwardly extending side members 36 of the yoke. A post 37 is revolubly mounted in the yoke and projects at its opposite ends from the upper and lower sides of the yoke. A sleeve 38 on the post abuts the top side of the yoke and a handle 39 is secured to the upper end of the post, the handle by its loose engagement with the upper end of the sleeve serving to support the post 37 in the yoke but permitting of its rotation by turning the handle. A link 40 is pivotally connected at its forward end to the sleeve 38 and its rear end is pivotally connected to the crank pin 21. A slot 41 is formed in the seat board through which the sleeve and the link 40 may be moved.

Cleats 42 are formed at the lower ends of the arms 28 and 29 upon which the feet of the user, who is sitting on the seat board rearwardly of the handle 39, places his feet. By oscillating the arms 28 and 29 and the plate 27 by the feet the link 26 is reciprocated to rotate the sprocket wheel 19 and drive the rear axle, and by grasping the handle 39 in his hands and rocking the sleeve toward and from himself the user may also cause link 40 to reciprocate to rotate the sprocket wheel 19 and drive the rear axle. Since the links 26 and 40 are connected to the sprocket wheel 19 at diametrically opposite points the post and the sleeve move forwardly while at the same time the foot rests move rearwardly. Hence when those parts are being moved in the opposite directions; that is, the user is pulling rearwardly on the handle and pushing forwardly on the foot rests, the user is enabled to apply a maximum of power to the sprocket wheel 19 for driving the vehicle at a high speed.

A block 43 is suitably secured to the lower end of the post 37, the opposite ends of which block are bifurcated. Links 44 and 45 are pivotally connected at their rear ends to the bifurcated ends of the block respectively and the forward ends of the links 44 and 45 are bifurcated vertically. The links 46 and 47 are pivotally connected to the bifurcated ends of the links 44 and 45 respectively, the forward ends of the links 46 and 47 being pivotally connected to the links 46' and 47' pivotally connected to a member 48 secured to a bar or lever 49 by the bolts or rivets 50. The lever 49 and the member 48 are vertically apertured for the reception of a king bolt 51 which bolt is inserted through the same and through a gland 52 and a bar 53 secured to the frame 10. The lever 49 and the attached member 48 are therefore revolubly mounted on the frame 10 and may be turned to the right or left by rotating the handle 39 in proper direction to rotate the post 37 and block 43 and impart reciprocation to the proper links connecting the block to the lever 49.

Links 54 are pivotally connected to the opposite ends of the lever 49, the cleats 55 being formed at the rear ends of the links upon which the user may place his feet while coasting. The forward ends of the links 54 are pivotally connected to the front axle 56 upon which the front wheels 57 are revolubly mounted, the axle being suitably supported by a bracket 58 pivoted to and depending from the forward end of the frame 10.

It is apparent that when the user is operating the vehicle and is rocking the post forwardly and backwardly he may at the same time rotate the post 37 by turning the handle 39, and since the links 44 and 45 are pivoted to the block 43 for horizontal or lateral movement thereon and the links 46 and 47 are pivoted to the links 44 and 45 for vertical movement thereon, the rotary movement of the post is readily translated into a horizontal rotary movement in the lever 49 which in turn causes the links 54 to turn the front axle in the selected direction for steering the vehicle. During all these operations the user is also using his feet to propel the vehicle as well as his hands and arms.

Preferably the seat board is extended in front of the combined propelling and steering member, upon which the user may place various articles for transportation, such as newspapers, packages and the like for delivery purposes. He may also place articles on the seat behind him. Any type of seat may be used and it may be equipped obviously with any form of article retaining device if desirable to do so.

It will be noted that the pivotal point of the steering and propelling column is forward of the longitudinal axis of that column, hence in all positions of the column, while being operated for propelling the vehicle, the post may be rotated to steer the vehicle, since the link connections to the front axle form practically a universal joint.

What I claim is:

1. In a vehicle, the combination of a main frame, front and rear axles on the frame, the front axle being pivoted, wheels on the axles, a yoke pivoted at its opposite sides to the frame, a post revolubly mounted in the yoke rearwardly of the pivotal points of the yoke and adapted to be actuated by the occupant of the vehicle for rocking the yoke on its pivots, a transmission means between the yoke and the rear axle for driving the said axle, a member secured to the lower end of the post and rotatable therewith between the arms of the yoke, and a linkage means connecting the opposite ends of the said member and the opposite ends of the front axle for steering the vehicle.

2. In a vehicle, a main frame, a rear axle mounted on the frame, a front axle pivotally mounted on the frame, wheels on the axles, a rotatable member mounted on the frame and having a driving connection to the rear axle, a yoke pivotally mounted on the frame, means having a pivotal connection to the yoke and to the rotatable member for driving the said member, a rod rotatably mounted in the yoke, a handle secured to the upper end of the rod by which to rotate the rod and to oscillate the yoke simultaneously or independently, a member secured to the lower end of the rod, a pair of links pivotally connected to opposite sides of the latter member and rearwardly of the pivotal points of the yoke, and a series of links having connection with the said pair of links and with the front axle for rotating the same in a horizontal plane, when the rod is rotated, for steering the vehicle.

3. In a vehicle, a main frame, a rear axle mounted on the frame, a front axle pivotally mounted on the frame, wheels on the axles, a rotatable member mounted on the frame and having a driving connection to the rear axle, an oscillating member depending from the frame and having a driving connection to the rotatable member and adapted to be operated by the feet of the user, a rocking yoke pivoted on the frame, an upstanding rod revolubly mounted in the yoke, a sleeve on the rod and engaging the upper side of the yoke, a link pivotally connected to the sleeve and to the rotatable member, a handle secured to the upper end of the rod for simultaneously or independently rotating the rod and rocking the yoke and sleeve forwardly and backwardly by hand, a member secured to the lower end of the rod, a lever pivotally mounted on the frame forwardly of the yoke, and a system of links pivotally connected to the latter member and to the lever for rotating the lever in a horizontal plane when the rod and said member are rotated and means connecting the lever and the front axle for rotating the said axle in a horizontal plane for steering the vehicle.

In witness whereof I have hereunto subscribed my name this 26th day of November, 1921.

JOHN S. BITNER.